United States Patent
Lubischer et al.

(10) Patent No.: US 9,919,724 B2
(45) Date of Patent: Mar. 20, 2018

(54) RETRACTABLE STEERING COLUMN WITH MANUAL RETRIEVAL

(71) Applicant: Steering Solutions IP Holding Corporation, Saginaw, MI (US)

(72) Inventors: Frank P. Lubischer, Commerce Township, MI (US); John F. Schulz, Saginaw, MI (US); James E. Rouleau, Burt, MI (US); Shawn A. Haring, Swartz Creek, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/840,631

(22) Filed: Aug. 31, 2015

(65) Prior Publication Data

US 2016/0347347 A1    Dec. 1, 2016

Related U.S. Application Data

(60) Provisional application No. 62/168,167, filed on May 29, 2015.

(51) Int. Cl.
| | |
|---|---|
| *B62D 1/181* | (2006.01) |
| *F16H 25/20* | (2006.01) |
| *B62D 1/02* | (2006.01) |
| *G05D 1/00* | (2006.01) |

(52) U.S. Cl.
CPC ............... *B62D 1/181* (2013.01); *B62D 1/02* (2013.01); *F16H 25/2025* (2013.01); *G05D 1/0088* (2013.01)

(58) Field of Classification Search
CPC ...... B62D 1/181; B62D 1/102; F16H 25/2025
See application file for complete search history.

(56) References Cited

U.S. PATENT DOCUMENTS

| | | | |
|---|---|---|---|
| 4,315,117 A | 2/1982 | Kokubo et al. | |
| 4,337,967 A | 7/1982 | Yoshida et al. | |
| 4,503,300 A | 3/1985 | Lane, Jr. | |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

China Patent Application No. 201510204221.5 Second Office Action dated Mar. 10, 2017, 8 pages.

(Continued)

*Primary Examiner* — Faye M Fleming
(74) *Attorney, Agent, or Firm* — Cantor Colburn LLP

(57) ABSTRACT

A steering column assembly is provided and includes a steering column shaft and a column adjustment assembly configured to translate the steering column shaft between a retracted position and a deployed position. A disengagement assembly selectively couples a steering column telescope lead screw to the column adjustment assembly. The disengagement assembly is configured to selectively disengage the telescope lead screw from the column adjustment assembly to facilitate manual movement of the steering column shaft between the retracted position and the deployed position.

19 Claims, 5 Drawing Sheets

(56) References Cited

U.S. PATENT DOCUMENTS

| | | | |
|---|---|---|---|
| 4,503,504 A | 3/1985 | Suzumura et al. | |
| 4,561,323 A | 12/1985 | Stromberg | |
| 4,691,587 A | 9/1987 | Farrand et al. | |
| 4,836,566 A | 6/1989 | Birsching | |
| 4,921,066 A | 5/1990 | Conley | |
| 4,962,570 A | 10/1990 | Hosaka et al. | |
| 4,967,618 A * | 11/1990 | Matsumoto | B62D 1/181 280/775 |
| 4,976,239 A | 12/1990 | Hosaka | |
| 5,240,284 A | 8/1993 | Takada et al. | |
| 5,295,712 A | 3/1994 | Omura | |
| 5,319,803 A | 6/1994 | Allen | |
| 5,488,555 A | 1/1996 | Asgari | |
| 5,618,058 A | 4/1997 | Byon | |
| 5,668,721 A | 9/1997 | Chandy | |
| 5,690,362 A * | 11/1997 | Peitsmeier | B62D 1/19 280/775 |
| 5,893,580 A | 4/1999 | Hoagland et al. | |
| 5,911,789 A * | 6/1999 | Keipert | B62D 1/181 280/775 |
| 6,070,686 A | 6/2000 | Pollmann | |
| 6,170,862 B1 | 1/2001 | Hoagland et al. | |
| 6,227,571 B1 | 5/2001 | Sheng et al. | |
| 6,277,571 B1 | 5/2001 | Sheng et al. | |
| 6,301,534 B1 | 10/2001 | McDermott, Jr. | |
| 6,354,622 B1 | 3/2002 | Ulbrich et al. | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 * | 5/2002 | Wilson | B62D 1/181 280/775 |
| 6,578,449 B1 | 6/2003 | Anspaugh et al. | |
| 6,612,393 B2 | 9/2003 | Bohner et al. | |
| 6,819,990 B2 | 11/2004 | Ichinose | |
| 7,021,416 B2 | 4/2006 | Kapaan et al. | |
| 7,048,305 B2 | 5/2006 | Muller | |
| 7,062,365 B1 | 6/2006 | Fei | |
| 7,295,904 B2 | 11/2007 | Kanevsky et al. | |
| 7,308,964 B2 | 12/2007 | Hara et al. | |
| 7,428,944 B2 | 9/2008 | Gerum | |
| 7,437,902 B2 | 10/2008 | Monash | |
| 7,461,863 B2 | 12/2008 | Muller | |
| 7,495,584 B1 | 2/2009 | Sorensen | |
| 7,628,244 B2 | 12/2009 | Chino et al. | |
| 7,719,431 B2 | 5/2010 | Bolourchi | |
| 7,735,405 B2 | 6/2010 | Parks | |
| 7,793,980 B2 | 9/2010 | Fong | |
| 7,862,079 B2 | 1/2011 | Fukawatase et al. | |
| 7,894,951 B2 | 2/2011 | Norris et al. | |
| 7,909,361 B2 | 3/2011 | Oblizajek et al. | |
| 8,002,075 B2 | 8/2011 | Markfort | |
| 8,027,767 B2 | 9/2011 | Klein et al. | |
| 8,069,745 B2 | 12/2011 | Strieter et al. | |
| 8,079,312 B2 | 12/2011 | Long | |
| 8,146,945 B2 * | 4/2012 | Born | B62D 1/181 280/775 |
| 8,170,725 B2 | 5/2012 | Chin et al. | |
| 8,260,482 B1 | 9/2012 | Szybalski et al. | |
| 8,352,110 B1 | 1/2013 | Szybalski et al. | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 * | 2/2014 | Matsuno | B62D 1/181 74/492 |
| 8,670,891 B1 | 3/2014 | Szybalski et al. | |
| 8,695,750 B1 | 4/2014 | Hammond et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B2 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,108,584 B2 | 8/2015 | Rao et al. | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 * | 2/2016 | Mizuno | B62D 1/181 |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,333,983 B2 | 5/2016 | Lathrop et al. | |
| 9,352,752 B2 | 5/2016 | Cullinane et al. | |
| 9,360,865 B2 | 6/2016 | Yopp | |
| 2003/0046012 A1 | 3/2003 | Yamaguchi | |
| 2003/0094330 A1 | 5/2003 | Boloorchi et al. | |
| 2003/0227159 A1 | 12/2003 | Muller | |
| 2004/0016588 A1 | 1/2004 | Vitale et al. | |
| 2004/0046346 A1 | 3/2004 | Eki et al. | |
| 2004/0099468 A1 | 5/2004 | Chernoff et al. | |
| 2004/0129098 A1 | 7/2004 | Gayer et al. | |
| 2004/0204808 A1 | 10/2004 | Satoh et al. | |
| 2004/0262063 A1 | 12/2004 | Kaufmann et al. | |
| 2005/0001445 A1 | 1/2005 | Ercolano | |
| 2005/0081675 A1 | 4/2005 | Oshita et al. | |
| 2005/0197746 A1 | 9/2005 | Pelchen et al. | |
| 2005/0275205 A1 | 12/2005 | Ahnafield | |
| 2006/0224287 A1 | 10/2006 | Izawa et al. | |
| 2006/0244251 A1 | 11/2006 | Muller | |
| 2007/0021889 A1 | 1/2007 | Tsuchiya | |
| 2007/0029771 A1 | 2/2007 | Haglund et al. | |
| 2007/0046003 A1 | 3/2007 | Mori et al. | |
| 2007/0046013 A1 | 3/2007 | Bito | |
| 2007/0241548 A1 | 10/2007 | Fong | |
| 2007/0284867 A1 | 12/2007 | Cymbal et al. | |
| 2008/0009986 A1 | 1/2008 | Lu et al. | |
| 2008/0238068 A1 | 10/2008 | Kumar et al. | |
| 2009/0024278 A1 | 1/2009 | Kondo et al. | |
| 2009/0256342 A1 | 10/2009 | Cymbal et al. | |
| 2009/0276111 A1 | 11/2009 | Wang et al. | |
| 2009/0292466 A1 | 11/2009 | McCarthy et al. | |
| 2010/0152952 A1 | 6/2010 | Lee et al. | |
| 2010/0222976 A1 | 9/2010 | Haug | |
| 2010/0228417 A1 | 9/2010 | Lee et al. | |
| 2010/0228438 A1 | 9/2010 | Buerkle | |
| 2010/0280713 A1 | 11/2010 | Stahlin et al. | |
| 2010/0286869 A1 | 11/2010 | Katch et al. | |
| 2010/0288567 A1 | 11/2010 | Bonne | |
| 2011/0098922 A1 | 4/2011 | Ibrahim | |
| 2011/0153160 A1 | 6/2011 | Hesseling et al. | |
| 2011/0167940 A1 | 7/2011 | Shavrnoch et al. | |
| 2011/0187518 A1 | 8/2011 | Strumolo et al. | |
| 2011/0266396 A1 | 11/2011 | Abildgaard et al. | |
| 2011/0282550 A1 | 11/2011 | Tada et al. | |
| 2012/0136540 A1 | 5/2012 | Miller | |
| 2012/0205183 A1 | 8/2012 | Rombold | |
| 2012/0209473 A1 | 8/2012 | Birsching et al. | |
| 2012/0215377 A1 | 8/2012 | Takemura et al. | |

(56) References Cited

U.S. PATENT DOCUMENTS

| | | |
|---|---|---|
| 2013/0087006 A1 | 4/2013 | Ohtsubo et al. |
| 2013/0158771 A1 | 6/2013 | Kaufmann |
| 2013/0233117 A1 | 9/2013 | Read et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0111324 A1 | 4/2014 | Lisseman et al. |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0375769 A1 | 12/2015 | Abboud et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Watz |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102452391 A | 5/2012 |
| CN | 103419840 A2 | 12/2013 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | H05162652 A | 6/1993 |
| KR | 20100063433 A | 6/2010 |
| WO | 2006099483 A1 | 9/2006 |
| WO | 2010082394 A1 | 7/2010 |
| WO | 2010116518 A1 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.

* cited by examiner

RETRACTABLE STEERING COLUMN WITH MANUAL RETRIEVAL

CROSS-REFERENCE TO RELATED APPLICATION

This patent application claims priority to U.S. Provisional Patent Application Ser. Nos. 62/168,167, filed May 29, 2015, which is incorporated herein by reference in its entirety.

FIELD OF THE INVENTION

The following description relates to steering column assemblies and, more specifically, to a manually retrievable retractable steering column assembly.

BACKGROUND

When some vehicles are fitted with autonomous driving assist systems, it may become possible to retract the steering column and wheel away from the driver to provide space for non-driving related activities such as working, reading, and game playing. However, the driver may need to be able to retrieve the wheel from its retracted position quickly enough to safely take control when an autonomous driver assistance system relinquishes control.

Accordingly, it is desirable to provide a steering column assembly that enables the driver to rapidly return the wheel from a retracted position.

SUMMARY OF THE INVENTION

In one exemplary embodiment of the invention, a steering column assembly is provided and includes a steering column shaft and a column adjustment assembly configured to translate the steering column shaft between a retracted position and a deployed position. A disengagement assembly selectively couples a steering column telescope lead screw to the column adjustment assembly. The disengagement assembly is configured to selectively disengage the telescope lead screw from the column adjustment assembly to facilitate manual movement of the steering column shaft between the retracted position and the deployed position.

In another exemplary embodiment of the invention, a vehicle including a steering column assembly having a steering column shaft, a column jacket, and a steering wheel coupled to the steering column shaft is provided. A column adjustment assembly is configured to translate the steering column shaft between a retracted position and a deployed position. A disengagement assembly selectively couples the steering column shaft to the column adjustment assembly. The disengagement assembly is configured to disengage the steering column shaft from the column adjustment assembly to facilitate manual movement of the steering column shaft between the retracted position and the deployed position.

In yet another exemplary embodiment of the invention, a method of assembling a steering column assembly is provided. A column adjustment assembly is provided and configured to translate a steering column shaft between a retracted position and a deployed position. A disengagement assembly is coupled between the steering column shaft and the column adjustment assembly. The disengagement assembly is configured to selectively disengage the steering column shaft from the column adjustment assembly to facilitate manual movement of the steering column shaft between the retracted position and the deployed position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1A:
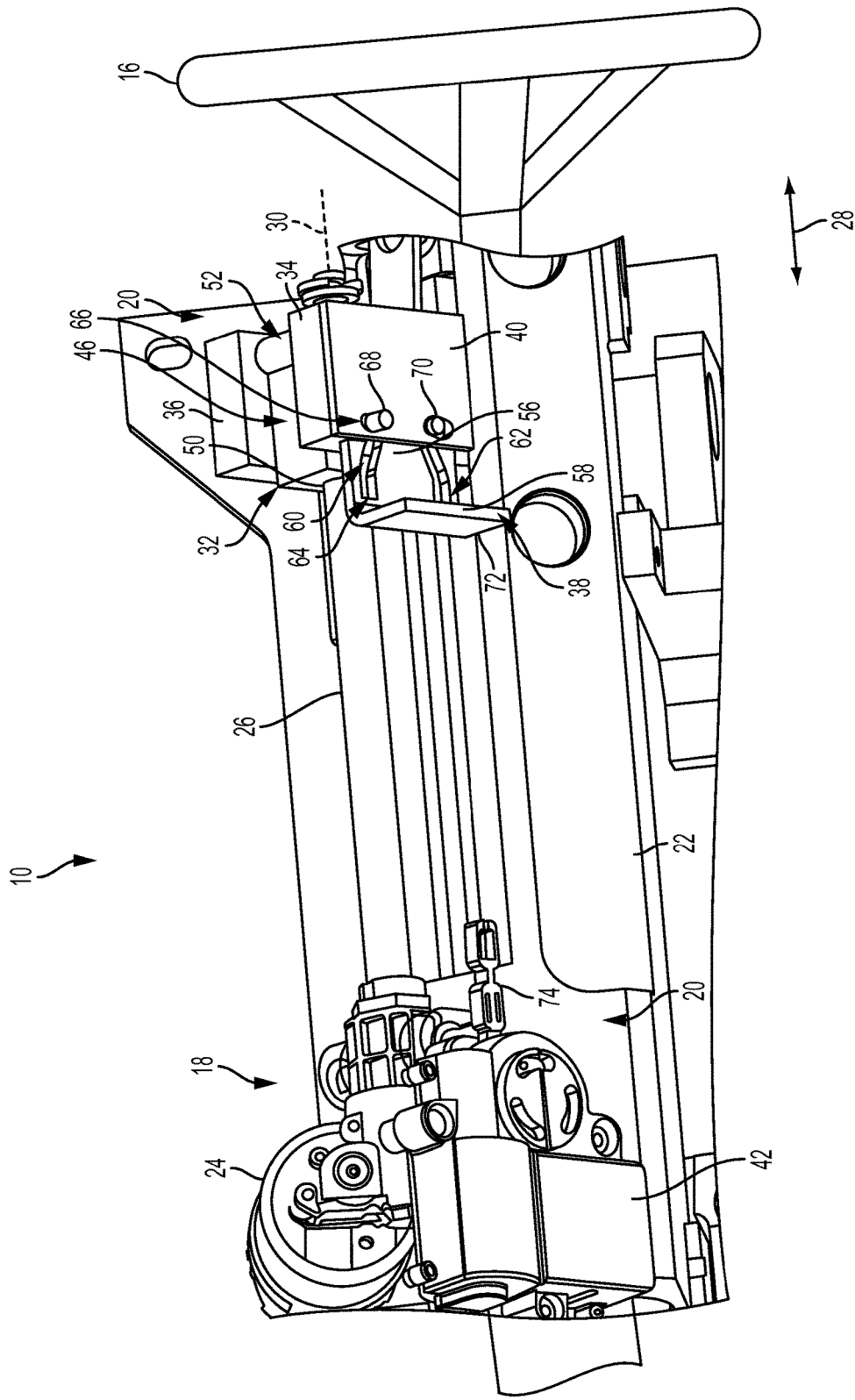
FIG. 1A is a perspective view of a steering column assembly in a first position according to one embodiment of the disclosure.
Figure 1B:
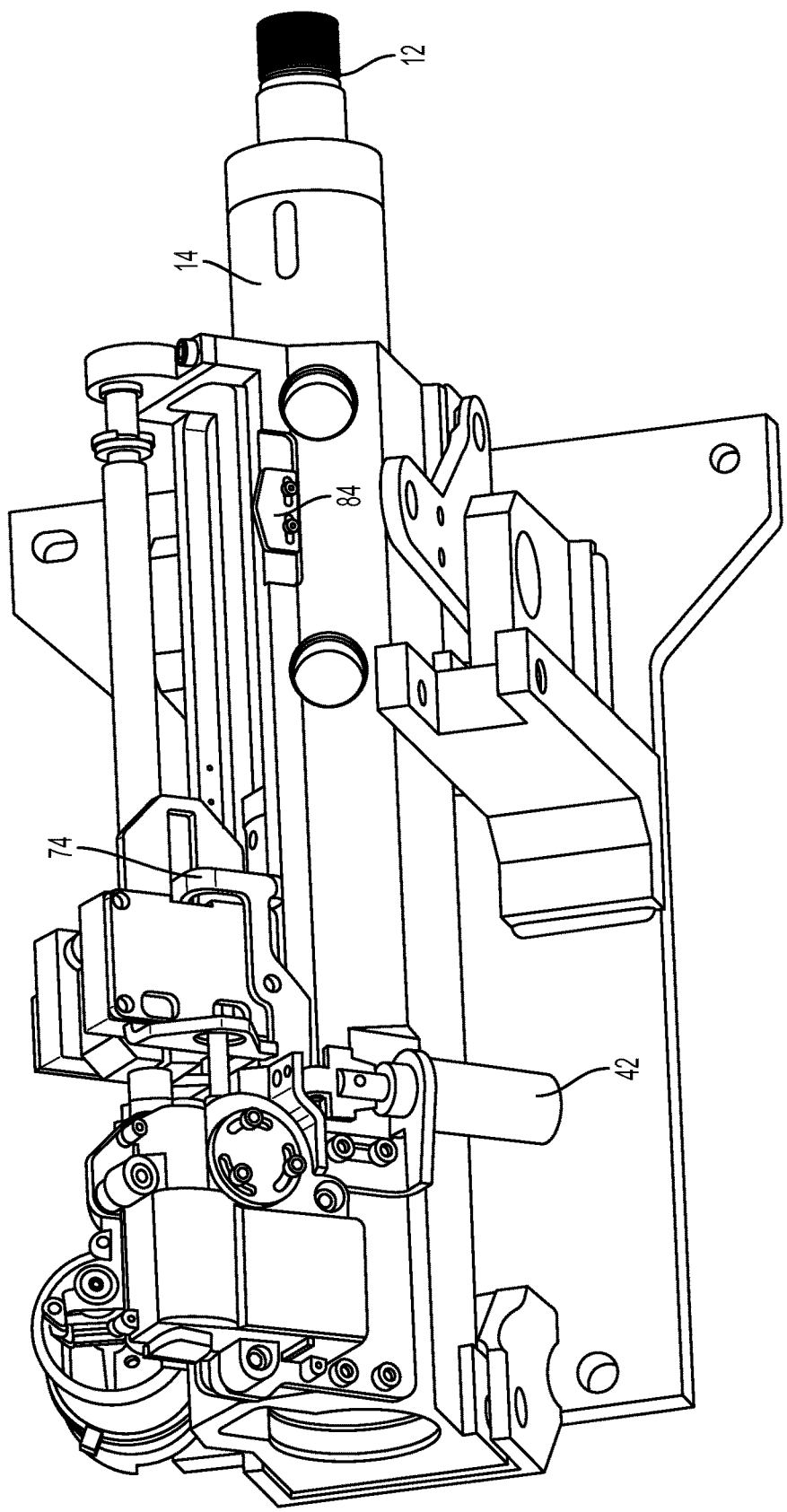
FIG. 1B is an alternate perspective view of the steering column assembly of FIG. 1A.
Figure 2:
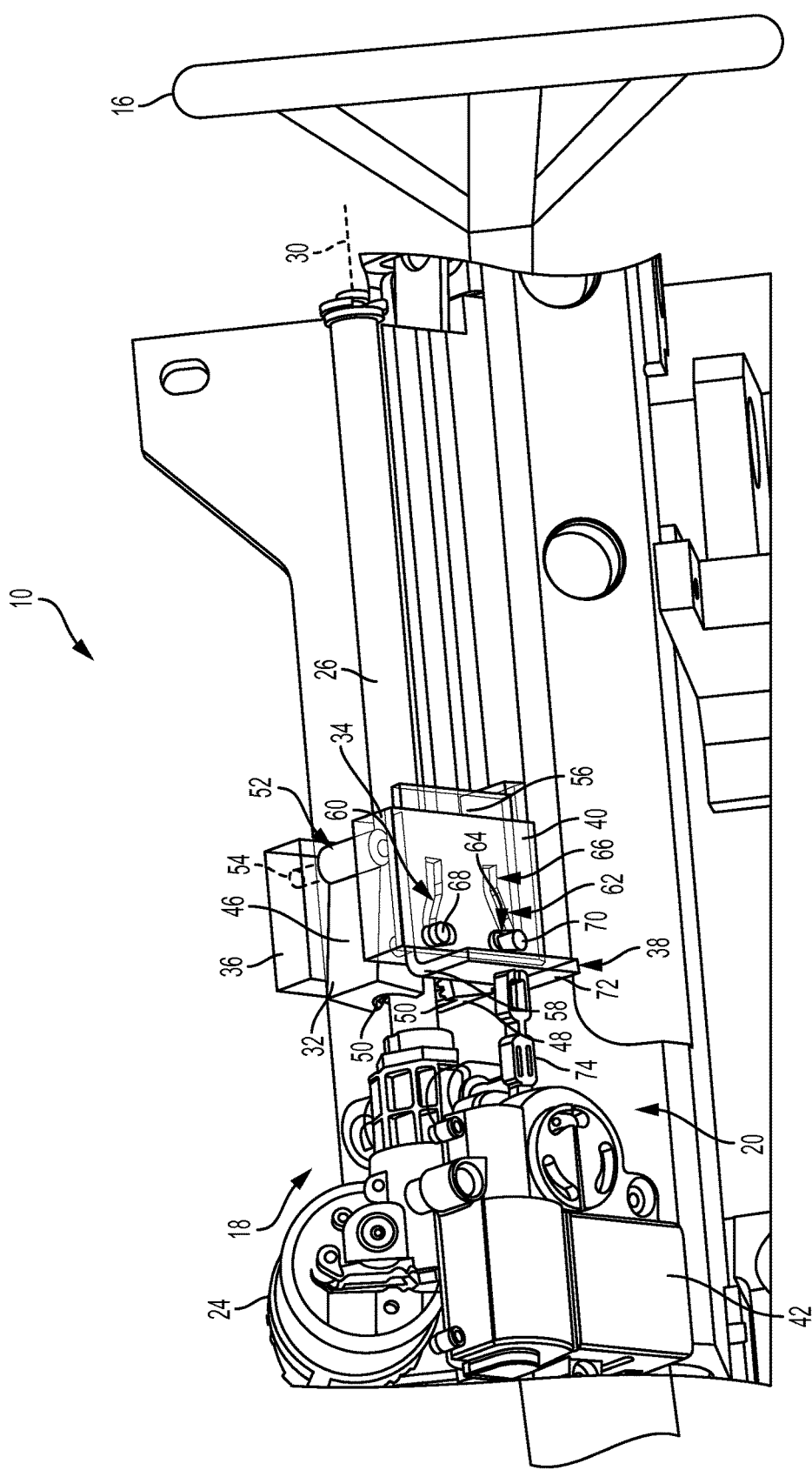
FIG. 2 is a perspective view of the steering column assembly shown in FIG. 1 in a second position.
Figure 3:
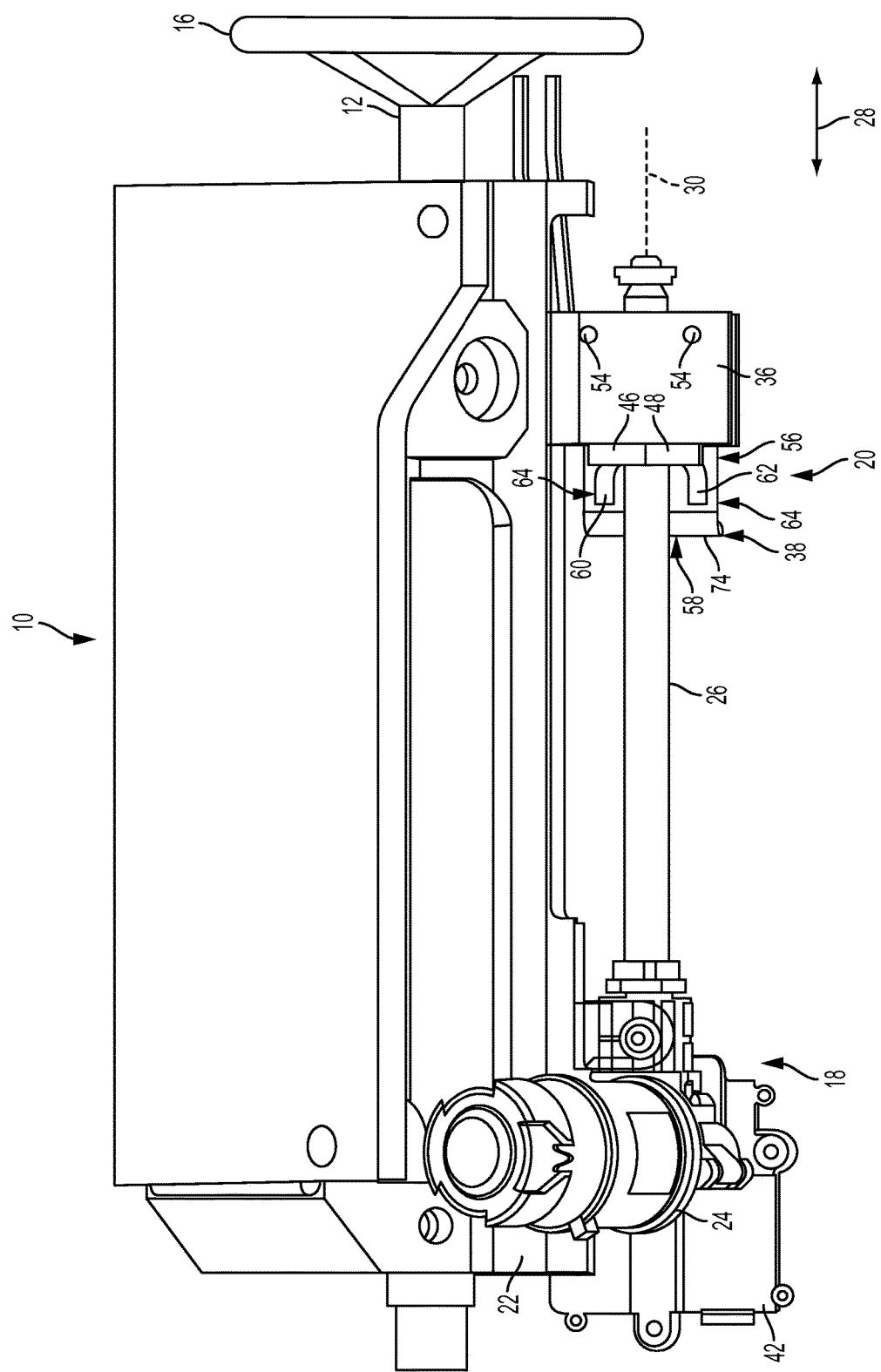
FIG. 3 is another perspective view of the steering column assembly shown in FIG. 1A.
Figure 4:
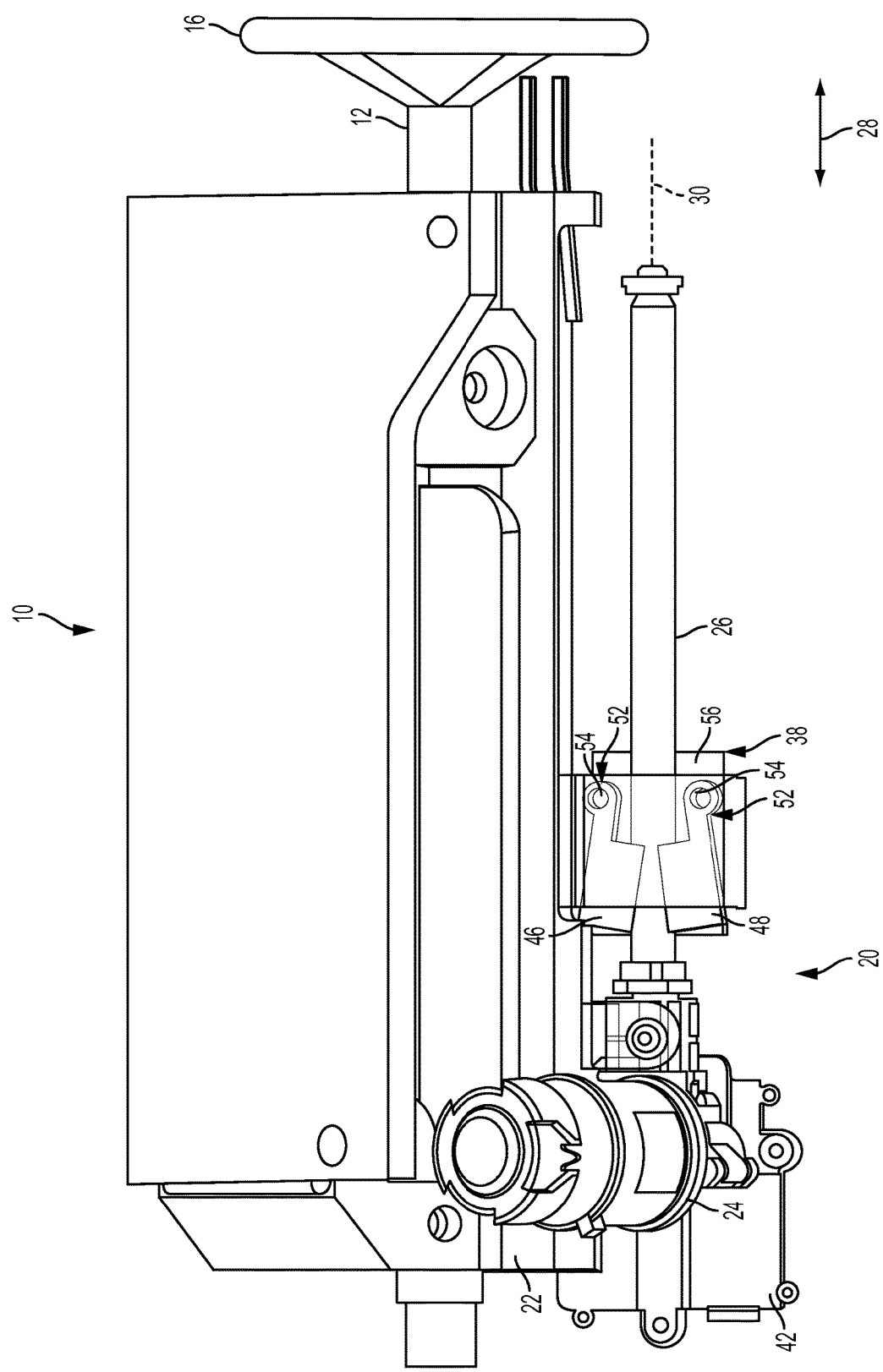
FIG. 4 is another perspective view of the steering column assembly shown in FIG. 2.

Referring now to the Figures, where the invention will be described with reference to specific embodiments, without limiting same, FIGS. 1-4 illustrate an exemplary retractable steering column assembly 10 that generally includes a steering telescoping column shaft 12, a column telescoping jacket 14, and a steering wheel 16 coupled to shaft 12. Assembly 10 further includes a steering column adjustment assembly 18 and a wheel disengagement assembly 20. FIGS. 1 and 3 illustrate assembly 20 in an engaged position, and FIGS. 2 and 4 illustrate assembly 20 in a disengaged position.

In the exemplary embodiment, adjustment assembly 18 is configured to move steering column assembly 10 between a deployed position and a retracted or retractable position. In the deployed position, steering wheel 16 may be used by a driver to steer the vehicle. In the retract position, portions of steering column assembly 10 such as steering wheel 16 are disposed away from the driver toward a vehicle instrument panel (not shown), which provides increased space for the driver.

Steering column adjustment assembly 18 generally includes a housing 22, a motor 24, and a lead screw 26. Housing 22 is coupled to the vehicle support structure and is disposed between column jacket 14 and lead screw 26. Motor 24 is coupled to housing 22 and selectively rotates telescope lead screw 26 to telescope shaft 12 and translate the telescoping jacket 14 along a screw axis 30 relative to housing. In the exemplary embodiment, lead screw 26 is threaded. An engagement component 32 selectively couples shaft 12/jacket 14 to assembly 18 (e.g., screw 26) and may be threadably engageable therewith. As such, motor 24 rotates lead screw 26 to drive shaft 12/jacket 14 in the direction of arrows 28.

Accordingly, steering column assembly 10 may be a power adjustable steering column with a telescope mode travel in the direction of arrows 28. Because the telescope mode rate of travel may be low, wheel disengagement assembly 20 allows the driver to bypass the power screw actuator so that steering wheel 16 may be gripped and quickly pulled to the normal driving position (i.e., the deployed position).

In the exemplary embodiment, wheel disengagement assembly 20 generally includes engagement component 32, opposed supports 34, 36, a cam plate or latching arm 38, a guide bracket 40, and a solenoid or actuator 42. In the illustrated embodiment, engagement component 32 is a split nut having a first portion 46 and an opposed second portion 48 that are movable between an engaged position (FIGS. 1A and 3) and a disengaged position (FIGS. 2 and 4). First and second portions 46, 48 each include a partial bore or recess 50 (FIG. 2) configured to be disposed about a portion (e.g., half) of lead screw 26 (see FIG. 1). Recess 50 may be threaded to meshingly engage the threads on lead screw 26.

Engagement component first and second portions 46, 48 each include a pivot end 52 pivotally coupled to one of supports 34, 36 by a pin 54. As such, first and second portions 46, 48 are pivotable between the engaged position (FIGS. 1A and 3) and the disengaged position (FIGS. 2 and 4). Supports 34, 36 are coupled to telescoping jacket 14.

In the exemplary embodiment, cam plate 38 includes a main body portion 56 and a flange portion 58. A first channel 60 and a second channel 62 are formed in main body portion 56. Channels 60, 62 are generally angled from a first end 64 to a second end 66 such that second ends 66 of adjacent channels 60, 62 are closer to each other than first ends 64 (see FIG. 2).

A first pin 68 extends through channel 60 and is coupled between guide bracket 40 and first portion 46 such that first pin 68 may travel along channel 60 between channel first end 64 and channel second end 66. As such, engagement component first portion 46 is moved into the disengaged position when first pin 68 is positioned at channel first end 64 (see FIG. 2), and first portion 46 is moved into the engaged position when first pin 68 is positioned at channel second end 66 (see FIG. 1).

Similarly, a second pin 70 extends through channel 62 and is coupled between guide bracket 40 and second portion 48 such that second pin 70 may travel along channel 62 between channel first end 64 and channel second end 66. As such, engagement component second portion 48 is moved into the disengaged position when second pin 70 is positioned at channel first end 64 (see FIG. 2), and second portion 48 is moved into the engaged position when first pin 68 is positioned at channel second end 66 (see FIG. 1).

In the exemplary embodiment, engagement component first portion 46 and/or second portion 48 may be fitted with a biasing mechanism (not shown) such as a spring to bias portion 46, 48 toward lead screw 26 to cause proper engagement therebetween.

In the exemplary embodiment, cam plate flange portion 58 defines a surface 72 that is coupled to or is configured to be engaged by an arm 74 extending from actuator 42. As such, actuator 42 utilizes arm 74 to selectively move cam plate 38 in the direction of arrows 28 to move engagement component 32 between the engaged position (FIG. 1A) and the disengaged position (FIG. 2).

In the illustrated embodiment, steering column assembly 10 includes a first switch 80 and a second switch 82. First switch 80 is electrically coupled to motor 24 and is configured to supply a command thereto, which turns lead screw 26 to retract or deploy steering column assembly 10 and wheel 16 at a predefined rate of speed. Second switch 82 is electrically coupled to actuator 42 and is configured to supply a command thereto, which moves arm 74 to retract or deploy cam plate 38 to move engagement component 32 between the engaged position and the disengaged position.

In operation, steering column assembly 10 may be in the deployed position with engagement component 32 in the engaged position to engage lead screw 26. First switch 80 may be subsequently manipulated to telescope steering column assembly 10 and wheel 16 to the retracted position away from the driver. In the exemplary embodiment, engagement component 32 may remain engaged to lead screw 26 when assembly 10 is in the retracted position. In other embodiments, engagement component 32 may be automatically disengaged when assembly 10 reaches the retracted position.

When the driver desires to return steering column assembly 10 and wheel 16 to the deployed position for use, in the exemplary embodiment, the driver manipulates second switch 82. This causes actuator 42 to retract arm 74 and cam plate 38 such that pins 68, 70 are positioned at channel first end 64, which withdraws engagement component portions 46, 48 away from engagement with lead screw 26. Actuator 42 latches the cam plate 38 in the disengaged position by extending and retracting arm 74 (a momentary movement). Alternatively, if only one recess 50 is threaded, only that associated component portion 46 or 48 may be withdrawn from engagement with lead screw 26.

With engagement component 32 in the disengaged position, component 32 may slide unimpeded over lead screw 26 such that the driver can rapidly move steering wheel 16 to its deployed, driving position. In the exemplary embodiment, the normal, non-energized position of actuator 42 causes engagement component 32 to engage lead screw 26. In other embodiments, the non-energized position of actuator 42 disengages component 32 from lead screw 26.

Accordingly, if the driver needs to quickly return steering wheel 16 from the retracted position, the driver need only press switch 82 (connected to actuator 42) to disengage component 32. In other embodiments, component 32 may automatically disengage when reaching the retracted position. This allows the driver to pull steering wheel 16 to the normal driving position free of any engagement with lead screw 26.

In some embodiments, when the driver pulls steering wheel 16 to the deployed, driving position, the separated engagement component portions 46, 48 are mechanically re-engaged with lead screw 26 such as by inclined, ramped surfaces of unlatching cam 84 of FIG. 1B. This retains latching arm 74 in the deployed driving position. Alternatively, assembly 10 may include an electrical position sensor (not shown) that may be utilized to cause portions 46, 48 to re-engage screw 26.

In some embodiments, the driver may also activate switch 82 to disengage component 32 and enable the driver to rapidly move steering column assembly 10 and wheel 16 from the deployed position to the retracted position.

In alternative embodiments, engagement component portions 46, 48 may be moved between the engaged and disengaged positions by first and second levers (not shown) pinned to open and close around screw 26, actuated by the rotation of a third lever (not shown) fitted with pins (not shown) to spread the first and second levers as if they were opening and closing jaws.

A method of assembling steering column assembly 10 includes providing shaft 12, jacket 14, and wheel 16 coupled to shaft 12. Column adjustment assembly 18 is operably coupled to shaft 12 and jacket 14 to move assembly 10 between the retracted position and the deployed position. Disengagement assembly 20 is operably coupled to column adjustment assembly 18 and is configured to disengage shaft 12 from assembly 18 to facilitate manual movement of shaft 12 and steering wheel 16 between the retracted position and the deployed position.

Described herein are systems and methods providing a steering column assembly that is movable between a retracted position and a deployed position. The steering column assembly includes telescope movement enabled by a column adjustment assembly. A disengagement assembly enables the steering column assembly to be selectively disengaged from the column adjustment assembly to enable a driver to quickly move the steering column assembly and steering wheel from the retracted position to the deployed position. As such, the driver can quickly return the wheel to the deployed, driving position quickly enough to safely take control when, for example, an autonomous driver assistance system relinquishes control of the vehicle. The described system gives the driver the ability to bypass the column adjustment assembly and thus quickly pull the steering wheel to the normal driving position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a steering column shaft;
   a column adjustment assembly configured to translate the steering column shaft between a retracted position and a deployed position;
   a disengagement assembly selectively coupling a steering column telescope lead screw to the column adjustment assembly, the disengagement assembly configured to selectively disengage the telescope lead screw from the column adjustment assembly to facilitate manual movement of the steering column shaft between the retracted position and the deployed position.

2. The steering column assembly of claim 1, wherein the column adjustment assembly comprises a lead screw.

3. The steering column assembly of claim 2, wherein the column adjustment assembly comprises a motor coupled to the lead screw and configured to turn the lead screw to retract and deploy the steering column shaft.

4. The steering column assembly of claim 2, wherein the disengagement assembly comprises an engagement component configured to selectively engage the lead screw.

5. The steering column assembly of claim 4, wherein the engagement component is a split nut having a first portion and a second portion.

6. The steering column assembly of claim 5, wherein the disengagement assembly further comprises at least one support, the split nut first and second portions each pivotally coupled to the at least one support.

7. The steering column assembly of claim 6, wherein the disengagement assembly further comprises an actuator configured to move the split nut between an engaged position where the split nut engages the lead screw, and a disengaged position where the split nut is disengaged from the lead screw.

8. The steering column assembly of claim 6, wherein the disengagement assembly further comprises:
   a cam plate having a ramped channel formed therein; and
   a pin coupled to the split nut and extending through the ramped channel, the pin operable to travel along the ramped channel from a first position to a second position, the first position of the pin causing the split nut to move to the engaged position, and the second position of the pin causing the split nut to move to the disengaged position.

9. The steering column assembly of claim 7, further comprising an electrical switch configured to operate the disengagement assembly to move the split nut between the engaged position and the disengaged position.

10. A vehicle comprising:
    a steering column assembly comprising:
    a steering column shaft;
    a column jacket;
    a steering wheel coupled to the steering column shaft;
    a column adjustment assembly configured to translate the steering column shaft between a retracted position and a deployed position;
    a disengagement assembly selectively coupling the steering column shaft to the column adjustment assembly, the disengagement assembly configured to disengage the steering column shaft from the column adjustment assembly to facilitate manual movement of the steering column shaft between the retracted position and the deployed position.

11. The vehicle of claim 10, wherein the column adjustment assembly comprises a lead screw.

12. The vehicle of claim 11, wherein the column adjustment assembly comprises a motor coupled to the lead screw and configured to turn the lead screw to retract and deploy the steering column shaft.

13. The vehicle of claim 11, wherein the disengagement assembly comprises an engagement component configured to selectively engage the lead screw.

14. The vehicle of claim 13, wherein the engagement component is a split nut having a first portion and a second portion.

15. The vehicle of claim 14, wherein the disengagement assembly further comprises at least one support, the split nut first and second portions each pivotally coupled to the at least one support.

16. The vehicle of claim 15, wherein the disengagement assembly further comprises an actuator configured to move the split nut between an engaged position where the split nut engages the lead screw, and a disengaged position where the split nut is disengaged from the lead screw.

17. The vehicle of claim 15, wherein the disengagement assembly further comprises:
    a cam plate having a ramped channel formed therein; and
    a pin coupled to the split nut and extending through the ramped channel, the pin operable to travel along the ramped channel from a first position to a second position, the first position of the pin causing the split nut to move to the engaged position, and the second position of the pin causing the split nut to move to the disengaged position.

18. The vehicle of claim 16, further comprising an electrical switch configured to operate the disengagement assembly to move the split nut between the engaged position and the disengaged position.

19. A method of assembling a steering column assembly, the method comprising:
    providing a steering column shaft;
    providing a column adjustment assembly configured to translate the steering column shaft between a retracted position and a deployed position; and coupling a disengagement assembly between the steering column shaft and the column adjustment assembly, the disengagement assembly configured to selectively disengage the steering column shaft from the column adjustment assembly to facilitate manual movement of the steering column shaft between the retracted position and the deployed position.

\* \* \* \* \*